United States Patent [19]

Noda et al.

[11] 4,233,717

[45] Nov. 18, 1980

[54] METHOD OF BEVELLING PORT OPENINGS IN CYLINDERS FOR TWO-CYCLE ENGINES

[75] Inventors: Kenichi Noda; Hiroshi Murakami, both of Tokyo; Noboru Kurata, Kamifukuoka, all of Japan

[73] Assignee: Honda Giken Kogyo Kabushiki Kaisha, Tokyo, Japan

[21] Appl. No.: 940,985

[22] Filed: Sep. 11, 1978

[30] Foreign Application Priority Data

Sep. 12, 1977 [JP] Japan ........................... 52-109700

[51] Int. Cl.[3] ........................ B23P 13/00; B23P 15/00

[52] U.S. Cl. ........................... 29/156.4 WL; 29/557; 29/527.6; 29/527.7; 123/65 A

[58] Field of Search ............... 29/156.4 WL, 156.4 R, 29/557, 558, 527.6, 527.7; 123/65 R, 65 PE, 65 A, 41.72, 41.67, 41.83, 41.84, 193 CH, 193 C

[56] References Cited

U.S. PATENT DOCUMENTS

| | | | |
|---|---|---|---|
| 2,331,554 | 10/1943 | Irgens | 123/41.72 |
| 2,560,700 | 7/1951 | Pervier | 123/41.72 |
| 2,736,300 | 2/1956 | Flynn, Jr. | 123/41.83 |
| 3,038,457 | 6/1962 | Garofali | 123/65 R |
| 3,389,454 | 6/1968 | Sattler | 29/558 |
| 3,542,000 | 11/1970 | Ellingsen | 409/132 |
| 3,657,078 | 4/1972 | Schweikher | 123/193 C |
| 3,800,386 | 4/1974 | Bishop | 29/157.1 R |
| 4,121,552 | 10/1978 | Mithuo et al. | 123/65 PE |

FOREIGN PATENT DOCUMENTS

| | | | |
|---|---|---|---|
| 1033460 | 7/1958 | Fed. Rep. of Germany | 123/65 R |
| 1052167 | 3/1959 | Fed. Rep. of Germany | 123/65 R |
| 573329 | 2/1958 | Italy | 123/65 A |

*Primary Examiner*—Daniel C. Crane

*Attorney, Agent, or Firm*—Irving M. Weiner; Melvin Yedlin; John Shortley

[57] ABSTRACT

A method of bevelling the peripheral edges of port openings on the inner wall of cylinders for two-cycle engines. At least the upper and lower edges of the port opening on the inner wall of a cylinder are shaped, in advance when casting the cylinder, into concavities arcuately recessed in both axial and radial directions of the cylinder. The boundary edges between the recessed concavities and the inner wall of the cylinder are lightly bevelled by pressing or grinding so that an excellent workability, mass-productivity, and great precision can be attained.

10 Claims, 10 Drawing Figures

METHOD OF BEVELLING PORT OPENINGS IN CYLINDERS FOR TWO-CYCLE ENGINES

The present invention relates to methods of bevelling peripheral edges of openings on the inner walls of cylinders, such as scavenging ports and exhaust ports provided in cylinders for two-cycle engines.

BACKGROUND OF THE INVENTION

In a two-cycle engine, an exhaust port and scavenging port are opened on an inner wall which defines a piston sliding surface of a cylinder. When the piston slides on the inner wall of the cylinder, the piston ring expands somewhat radially out of the opening and catches on the peripheral edge, transversely provided relative to the piston stroke, of the opening so that a ring sound is produced as a noise. When the port opening is formed to be square, the piston ring is released quickly to expand out on either one of the upper and lower edges of the opening and to slide in contact and interfere with an entire part of the outer edge, and as a result a comparatively large shock sound is generated. Such a shock sound is repeated with the reciprocation of the piston, and continued with the increase of the number of revolutions so that the sound results in a noise. Particularly, in a two-cycle engine designed to have high performance, because the upper edge of the port is formed to be straight to rapidly discharge combusted gases and suck in a gaseous mixture, the generation of the above-mentioned noise is considerable.

As a countermeasure to such noise, if the upper and lower edges, transverse to piston strokes, of the port opening are machined to be arcuate so that the part contacting the piston ring may be gradually increased and decreased, the sliding contact sound should be reduced. Further, if the boundaries between the port opening and the inner wall of the cylinder are not edged, but are curved, the shock at the time of the sliding contact should be reduced as much as possible.

Conventional machining for arcuately bevelling the port opening edges is generally made by cutting. However, such machining is very difficult, particularly in a two-cycle engine which has a small volume. It is complicated and difficult to accurately machine the opening shape of a port in a small diameter cylinder. Such work is done partly manually and requires great skill. The resulting bevels of the opening edge are not uniform and therefore there are precision and mass-productivity problems. When machine cutting is used in consideration of the precision and mass-production, a large cutting allowance is required. Therefore the port opening shapes vary, and the critical port timing is likely to be improper. Further, when the opening edge is arcuately shaped by cutting or the like, burrs may be produced on the boundary of the arcuate concave part with the inner wall surface of the cylinder, and such burrs will have to be removed in a separate step from the cutting work.

As described above, in the conventional method by cutting or the like, regardless of the manual or machine operations, the cutting amount is so large as to be liable to deform the port opening, the bevelling work is difficult, and burrs must be removed, thereby increasing the number of steps, and efficient and effective mass-production and precision are hindered.

Therefore, instead of the above, it has been suggested to press a square port opening with a roller or the like and arcuately bevel it. However, it is difficult to attain a sufficient arcuate shape around the port opening in a cylinder fitted with a cast iron sleeve and to make a necessary and sufficient bevel with great precision. Because in order to make a sufficient bevel with only the pressing work, it would be necessary to repeat the pressing work many times. Further, if the working pressure is increased radically to accomplish the above with a minimum of steps, the port opening is likely to be deformed.

In view of the above-mentioned conventional problems in bevelling ports in cylinders, especially for two-cycle engines, the present invention has been made to effectively solve such problems.

SUMMARY OF THE INVENTION

The present invention provides a method of bevelling a port opening in a cylinder of an engine, comprising the steps of: shaping at least the upper and lower edges, transverse to a piston stroke, of a port opening on an inner wall of a cylinder; said shaping being done integrally with said cylinder when casting said cylinder; said edges being shaped into concavities which are arcuately recessed in both the axial and radial directions of said cylinder; and bevelling the boundary edges between said recessed concavities and the inner wall surface of said cylinder with a rotary member having a substantially smooth peripheral surface.

An object of the invention is to provide a method of bevelling port openings in cylinders, especially for two-cycle engines, wherein at least the upper and lower edges of the port opening on the inner wall of a cylinder are shaped at the time of casting the cylinder into concavities arcuately recessed in both axial and radial directions of the cylinder, and the boundary edges between the recessed concavities and the inner wall of the cylinder are bevelled while being pressed with a rotor of a substantially smooth peripheral surface.

The invention also provides a method wherein the boundary between the concavity of the port opening and the inner wall of the cylinder is pressed and shaped with a roller, or, is ground and shaped with a rotary hone so that the boundary edge between the concavity integrally provided by casting in advance and the inner wall of the cylinder may be lightly bevelled.

Another object is to provide a method of bevelling port openings wherein an arcuate concavity is cast integrally with a cylinder in advance on a port opening, and is only press-shaped or grind-shaped so that a cylinder having predetermined bevelling can be obtained with a simple and easy operation, with great precision and excellent workability and mass-productivity.

Still another object is to provide a bevelling method wherein, because a concavity is provided in advance on the periphery of an opening, during casting, parts to be bevelled will be as few as possible, the port opening will not be deformed, the port timing will not be varied or will not be set out of order so that the inherent performance of the engine will not be impaired, and performance will not be reduced.

A further object is to provide a bevelling method wherein, because no cutting is done, a concavity will be easy to shape. No special working means and no difficult shaping of an opening in a small diameter engine will be required. A precise bevel will be easily made. No burrs will be produced at all, and no work of removing the burrs will be required. Thus, cylinder ports with great precision will be able to be mass-produced in a simple operation.

A further object is to provide a bevelling method wherein, because no cutting is used, the strength of the port opening and also of the cylinder will be sufficiently maintained, and the noise caused by the interference of the port opening with the piston ring will be reduced as much as possible.

DETAILED DESCRIPTION OF PREFERRED EMBODIMENTS OF THE INVENTION

Figure 1:
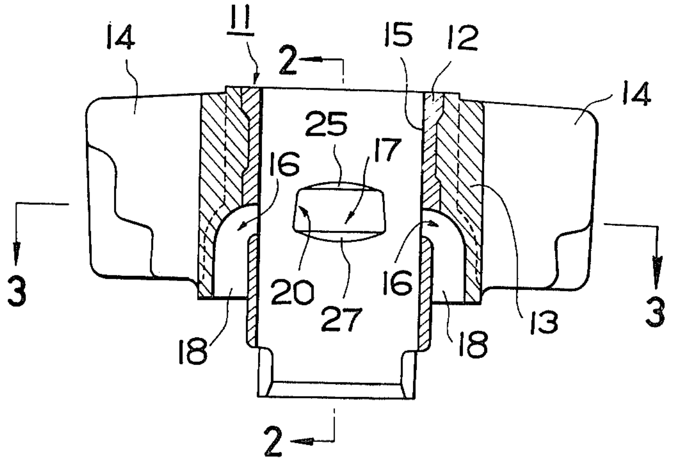
FIG. 1 is a vertically sectioned view of a cylinder of a two-cycle engine.
Figure 2:
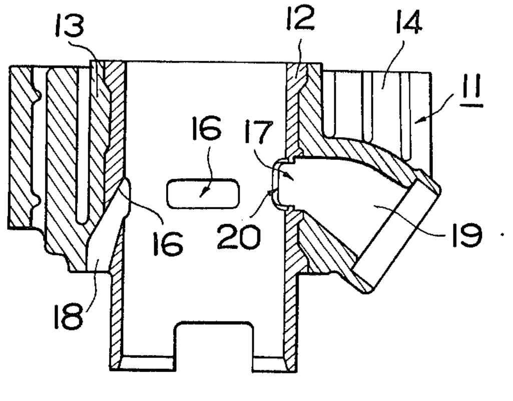
FIG. 2 is a sectioned view on line 2—2 in FIG. 1.
Figure 3:
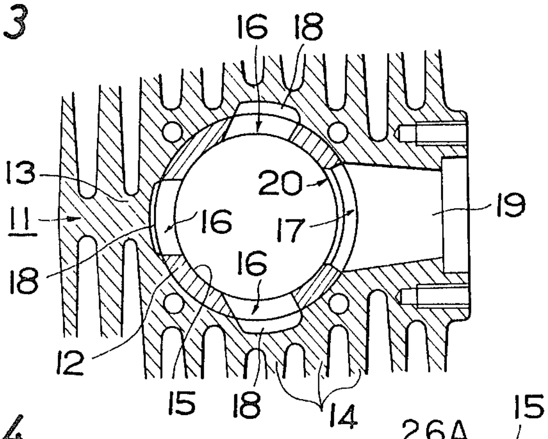
FIG. 3 is a sectioned view on line 3—3 in FIG. 1.

Referring to FIG. 1, a cylinder 11 of a two-cycle engine has an iron sleeve 12 cast integrally therewith. A block 13, formed from an aluminum alloy or the like, is integrally fitted at the middle or upper part of the outer periphery of sleeve 12, and has a plurality of cooling fins 14 integrally provided on its outer periphery.

In proper positions on the inner wall 15 of the cylinder sleeve 12, a scavenging port 16 and exhaust port 17 are integrally formed during the casting step and are connected to passages 18 and 19, respectively, provided correspondingly in the block 13. Passage 18 is connected to a crank chamber, and the other passage 19 is connected to an exhaust pipe to communicate with the atmosphere.

The opening part of every or any port, e.g., exhaust port 17, formed on the inner wall 15 of the sleeve 12 is formed as follows at the time of casting.

Figure 4:
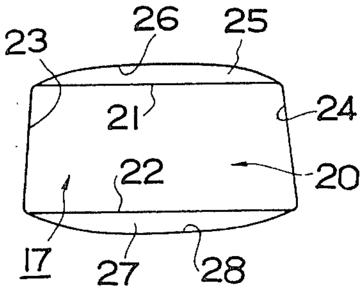
FIG. 4 is an enlarged elevation of a port opening.
Figure 5:
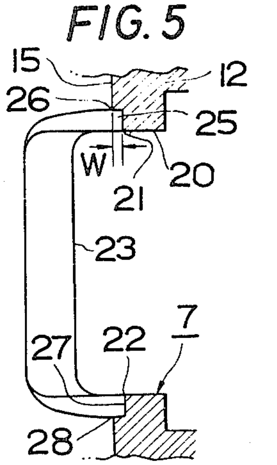
FIG. 5 is an enlarged vertically sectioned side view of a port opening.

FIGS. 4 and 5 are enlarged views of an opening 20 of port 17 on the inner wall 15 of the sleeve 12.

The front view of the port 17 is a trapezoidal shape, and the opening 20 is also made trapezoidal. Upper short edge 21 and lower long edge 22 are connected at both ends respectively with symmetrically inclined side edges 23 and 24 to form the trapezoidal opening 20.

The upper and lower edges 21 and 22, which are transversely provided relative to the piston stroke (axial direction of the sleeve), are formed with concavities 25 and 27 recessed arcuately in both directions, i.e., radially outwardly and axially of the cylinder sleeve. These concavities 25 and 27 are recessed substantially at right angles with the surface of the inner wall 15 of the sleeve by forming steps on the upper and lower edges 21 and 22 of the opening 20. Boundaries between the concavities 25 and 27 and the inner wall 15 are formed so that an upper boundary may be an edge 26 arcuately curved upwardly above the straight edge 21, and so that a lower boundary may be an edge 28 arcuately curved downwardly below the straight edge 22. These curved edges 26 and 28 join with the upper and lower straight edges 21 and 22 at both ends thereof.

The depth of the concavities 25 and 27, i.e., the depth W outward in the radial direction from the inner wall 15 is about 0.1 to 0.4 mm (FIG. 5). The concaved radial surface may be inclined with respect to the surface of the inner wall 15 in consideration of the extracting slopes of molds for casting of the sleeve.

In the next step, the boundary edges 26 and 28 formed in advance by casting are then pressed by applying a press roller thereon, or, the edges are burnished or ground by, for example, rotating a hone thereon so as to bevel the edges. This bevelling is made with the casting being covered with a black skin as it is. While the rotor is pressed against the arcuate boundary edges 26 and 28, the edges of the concavities are crushed, plastically deformed or ground to be bevelled.

Figure 8:
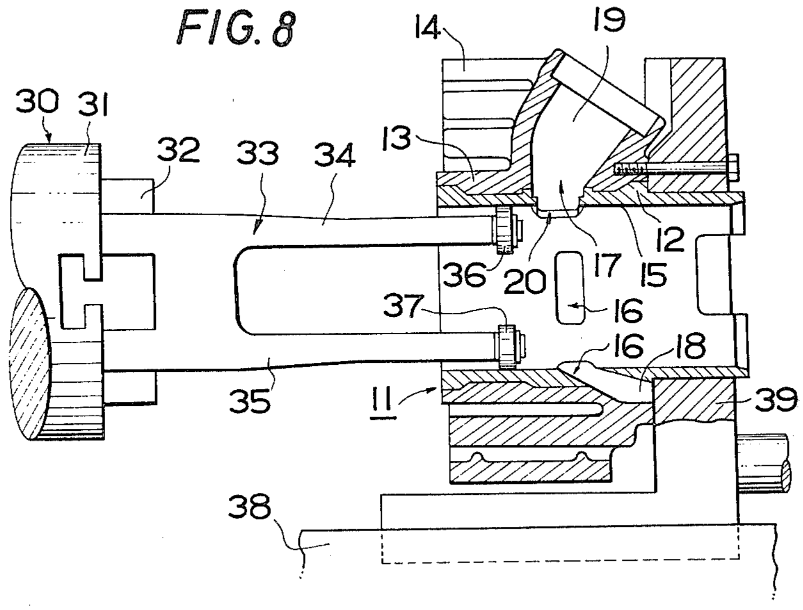
FIG. 8 is a view showing a bevelling device inserted in the cylinder shown in FIG. 2.

A device used for bevelling is shown in FIG. 8 by way of an example.

A forked supporting member 33 is secured with a fixture 32 to a spindle 31 of machine tool 30, such as a lathe. Legs 34 and 35 of the fork of the supporting member 33 are made to retain an expanding resiliency so as to expand outwardly. Rollers 36 and 37 are rotatably supported at the tips of legs 34 and 35. A cylinder 11 is horizontally mounted and supported through a jig on a moving base 39 provided on a bed 38.

Figure 6:
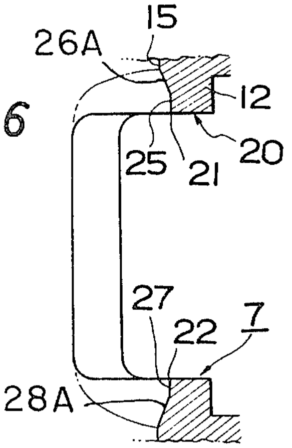
FIG. 6 is a similar view to FIG. 5, showing the condition after bevelling.

The legs 34 and 35 provided with the rollers 36 and 37 are inserted into the inner wall 15 of the sleeve 12 of the cylinder 11, and the rollers 36 and 37 are pressed against the boundary edges 26 and 28 to press and plastically deform the edges, and to crush and bevel them. Because the concavities 25 and 27 are arcuately shaped in advance about the upper and lower edges of the port opening 20, there is no need for conventional machining; such as cutting, and the boundary edges 26 and 28 need only be bevelled. Thus, the working pressure is low, and the bevelling can be made easily within a short time. FIG. 6 shows the condition after the bevelling, and the bevelled parts are shown as 26A and 28A therein.

Apart from the above-described press bevelling, when the spindle is provided with a rod to which a hone is secured, and the spindle is then rotated to grind the boundary edges 26 and 28, the same bevelling will also be performed. In such case, the hone grinding can be satisfactorily performed with only a slight work for correction of the boundary edges.

With only such bevelling work by pressing or grinding, there can be obtained a port in which the extent of interference with the piston ring is considerably decreased with less friction and less noise due to the bevelled arcuate parts. Also, because the concavities 25 and 27 are formed above and below the opening 20, bevelling can be done without interfering with the upper and lower edges 21 and 22 of the opening 20 so that the opening will not be deformed and the port timing will not be set out of order. Since the concavities are integrally shaped in advance at the time of casting, and only the edges of the concavities are bevelled by pressing or grinding, a high precision is maintained in the work.

Figure 7:
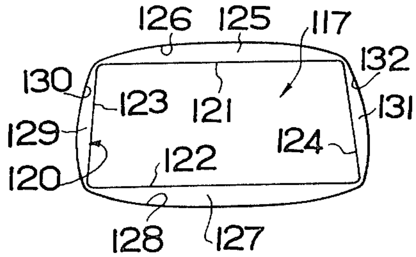
FIG. 7 is a similar view to FIG. 4, showing a modified embodiment of the port opening.

A modified embodiment is shown in FIG. 7. In the previously-described embodiment, the arcuate concavities are provided above and below the upper and lower opening edges, respectively. In this modified embodiment, the concavities are also provided on the side edges of the opening.

While the arcuate concavities 125 and 127 are provided respectively above and below the upper and lower edges 121 and 122, respectively, of an opening 120 of a port 117, other arcuate concavities 129 and 131 are further formed outwardly in the peripheral direction of the inner wall on both sides 123 and 124 of the opening. The boundaries 126, 128, 130 and 132 between the concavities 125, 127, 129 and 131 and the inner wall of the sleeve, are bevelled to eliminate angular edges by the method described above. According to this embodiment, the sliding contact of the piston ring with the port opening will decrease also on the right and left sides of the opening 120 and the previously-mentioned noise preventing effect can be further increased.

Figure 9:
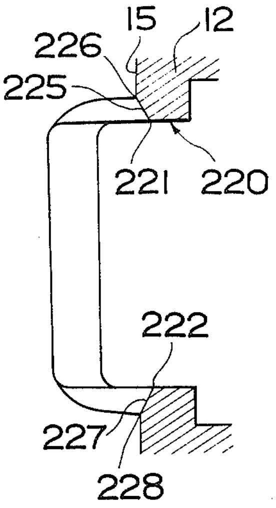
FIG. 9 is a similar view to FIG. 5 of the opening, showing a further modified embodiment.
Figure 10:
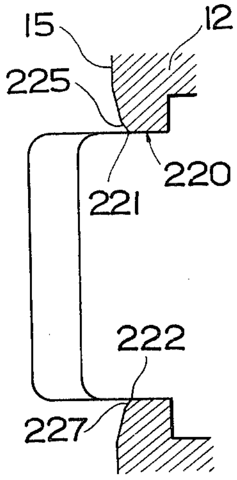
FIG. 10 is a similar view to FIG. 9 showing the condition after bevelling.

FIGS. 9 and 10 show a further embodiment of the invention.

In the above-mentioned embodiments, the concavity is previously made in a stepped shape but, in this embodiment, it is made as follows.

The upper and lower edges 221 and 222 of an opening 220 are connected with the inner wall 15 of the cylinder sleeve 12 through tapered surfaces. That is, the arcuate concavities 225 and 227 are made in advance to be inclined so as to slope down toward the opening. These tapered concavities 225 and 227 are integrally shaped at the time of casting, and thereafter the boundaries 226 and 228 are bevelled in the same manner as described above while the sleeve 12 is concave with the black skin as it is. FIG. 9 shows the condition before bevelling, and FIG. 10 shows the condition after bevelling. As in FIG. 7, the tapered concavities of this embodiment can also be provided on the right and left sides of the opening.

Because the tapered arcuate concavities are shaped in advance and the edges of the concavities are bevelled only by pressing or grinding, the bevelling can be done with great precision.

The foregoing description has been made with reference to the exhaust port, but the scavenging port can be formed in the same manner. When there are many scavenging ports, if all the scavenging ports are worked as mentioned above, the noise controlling effect will be very great.

Although in the above illustrated embodiments a cast iron sleeve is fixed in an aluminum alloy cylinder by pressing or casting the invention is not limited to only such case. It can also be applied to a cylinder wherein a hardened film is formed by applying an explosion melting jet or plasma melting jet to the inner surface of the cylinder made of an aluminum alloy. In such case, if the above-mentioned concavities are shaped together with the port opening, and then the boundaries between the concavities and the inner wall are pressed and bevelled, the same effects as above described will be obtained.

We claim:

1. A method of bevelling a port opening in a cylinder of an engine, said port opening having a pair of spaced side edges extending parallel with the cylinder axis and upper and lower edges extending therebetween, comprising the steps of:

shaping at least the upper and lower edges, transverse to a piston stroke, of a port opening, on an inner wall of a cylinder;

said shaping being done integrally with said cylinder when casting said cylinder;

said shaping being performed such that said upper edge is shaped into a concavity disposed above said port opening in said inner wall of said cylinder and said lower edge is shaped into a concavity disposed below said port opening in said inner wall of said cylinder, each said concavity being arcuately recessed in both the axial and radial directions of said cylinder; and bevelling only the boundary edges common to and between said recessed concavities and the inner wall surface of said cylinder with a rotary member having a substantially smooth peripheral surface.

2. A method according to claim 1, including:

forming steps on said upper and lower edges of said port opening to recess said concavities.

3. A method according to claim 1, including:

forming tapered surfaces to connect said upper and lower edges of said port opening to the inner wall surface of said cylinder.

4. A method according to claim 1, including:

forming on each side edge of said opening a concavity which is arcuated outwardly in the peripheral direction of the inner wall of said cylinder.

5. A method according to claim 1, 2, 3 or 4, including:

bevelling by press-shaping the boundaries between said concavities and the inner wall of said cylinder.

6. A method according to claim 1, 2, 3 or 4, including:

bevelling by grind-shaping the boundaries between said concavities and the inner wall of said cylinder.

7. A method according to claim 1, 2, 3 or 4, including:

fabricating said cylinder to include a cylinder block of an aluminum alloy and a cast iron sleeve both being made integral with each other.

8. A method according to claim 1, 2, 3 or 4, including:

fabricating said cylinder integrally of an aluminum alloy; and providing said cylinder with a hardened film on the inner wall surface thereof.

9. A method according to claim 2, including:

forming on each side edge of said opening a concavity which is arcuated outwardly in the peripheral direction of the inner wall of said cylinder.

10. A method according to claim 3, including:

forming on each side edge of said opening a concavity which is arcuated outwardly in the peripheral direction of the inner wall of said cylinder.

* * * * *